US 6,576,077 B1

(12) United States Patent
Mitsuhashi et al.

(10) Patent No.: US 6,576,077 B1
(45) Date of Patent: Jun. 10, 2003

(54) RUBBER TAPE HAVING SPECIFIC SHAPE FOR TIRE RUBBER COMPONENT

(75) Inventors: Terunobu Mitsuhashi, Chiryu (JP); Masahiko Ooki, Toyota (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/504,717

(22) Filed: Feb. 16, 2000

(30) Foreign Application Priority Data

Mar. 4, 1999 (JP) .......................... 11-057392

(51) Int. Cl.⁷ ..................... B29D 30/60; B29D 30/30
(52) U.S. Cl. ..................... 156/117; 156/130; 156/130.7
(58) Field of Search ............................. 156/117, 130, 156/130.7, 397, 406.4

(56) References Cited

U.S. PATENT DOCUMENTS

| RE25,349 E | * | 3/1963 | Hanson ............... 156/130 |
| 3,418,191 A | * | 12/1968 | Dieckmann et al. ........ 156/397 |
| 3,871,810 A | | 3/1975 | Geyer |
| 5,030,079 A | | 7/1991 | Benzing, II |
| 5,221,406 A | * | 6/1993 | Laurent ............... 156/397 |

FOREIGN PATENT DOCUMENTS

| DE | 0322221 A2 | 6/1989 |
| EP | 19718699 C1 | 5/1998 |

* cited by examiner

Primary Examiner—Geoffrey L. Knable
(74) Attorney, Agent, or Firm—Birch, Stewart, Kolasch & Birch, LLP (57) ABSTRACT

A rubber tape for making up a rubber component of a tire has a specific shape wherein a fin is provided on each side of a central part, the central part has a thickness of 0.3 to 1.5 mm, the fin has a thickness less than the thickness and a width of from 0.5 to 5.0 mm. A method of manufacturing a tire comprises a step of making at least one of rubber components by winding the rubber tape. An apparatus for making the rubber tape comprises an extruder and a pair of calendar rollers, wherein the extruder includes a die having an extruding hole from which compounded rubber is extruded into a rectangular cross sectional shape, the extruding hole has an opening width WA1 of from 0.6 to 0.9 times the whole width W0 of the rubber tape and an opening thickness HA1 of from 1.5 to 7.5 times the average thickness of the central part of the rubber tape, and the calendar rollers are provided therebetween with a gap between which the extruded rubber passes through, the gap having a shape which is similar to but smaller than a cross sectional shape of the rubber tape.

3 Claims, 8 Drawing Sheets

RUBBER TAPE HAVING SPECIFIC SHAPE FOR TIRE RUBBER COMPONENT

The present invention relates to a rubber tape for making up a rubber component of a tire, an apparatus for making the rubber tape, and a method of manufacturing a tire.

Vehicle tires, especially pneumatic tires are made up of a plurality of rubber components, e.g. tread rubber, sidewall rubber, clinch rubber, breaker cushion rubber, inner liner rubber and the like.

Usually such rubber components are manufactured by extruding unvulcanized rubber into a specific cross sectional shape which corresponds to the finished shape of the rubber component. This shape is determined by a die of the extruder.

If the rubber component is relatively large, the die becomes large and the size of the extruder can not be reduced. Further, it is necessary to prepare a lot of dies, depending on kinds of the tires to be produced, and the tire sizes, and the number of rubber components. Furthermore, to change the facilities from a certain rubber component to another rubber component, a lot of operations for changing and adjusting the die and the like are necessary.

Therefore, it is impossible to compact the tire production line, and it is difficult to establish a flexible manufacturing system.

Figure 10A:
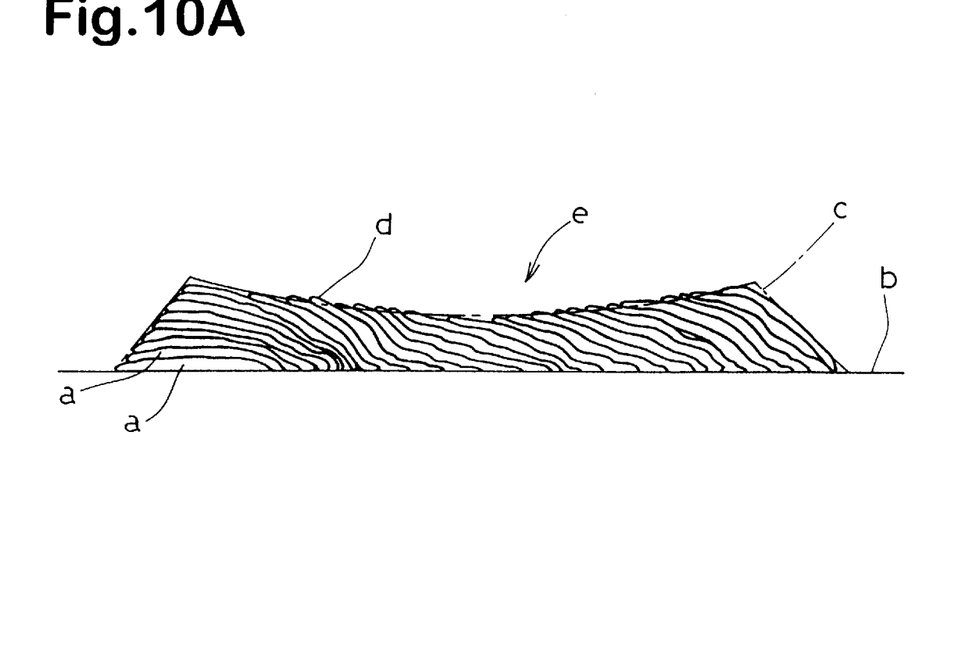
FIG. 10A is a cross sectional view showing a tread rubber made according to the prior art and FIG. 10B is a cross sectional view of the rubber tape used therefor.
Figure 10B:
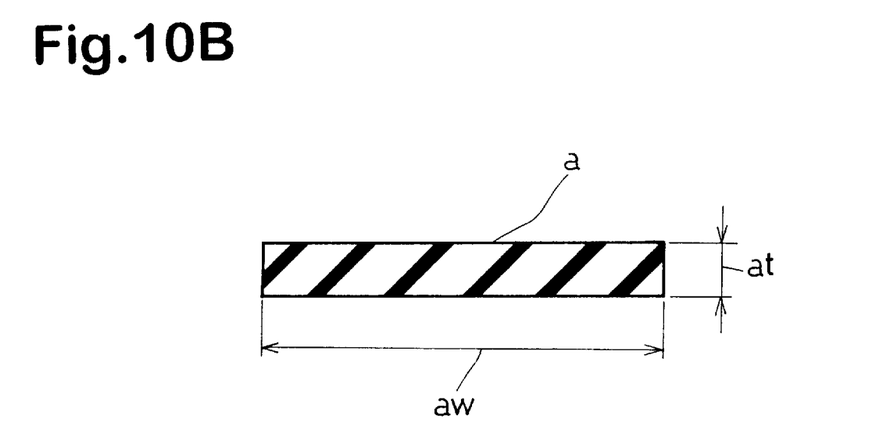

On the other hand, in the field of large-sized tires for construction vehicles, as shown in FIG. 10A, it has been proposed to make a tread rubber (e) by winding a rubber strip (a) continuously from one edge to the other edge because it is difficult to extrude a large-sized tire component since a very high extruding pressure is required. This rubber strip (a) has a rectangular cross sectional shape as shown in FIG. 10B.

If this method is employed in making a rubber component for relatively small sized tires such as passenger car tires, the difference of the contour (d) of the wound component from the designed target shape (c) (shown in FIG. 10A by a chain line) becomes large. Further, the surface of the rubber component often corrugates, and lines like clacks are liable to occur on the outer surface of the vulcanized rubber which not only worsens the appearance of the tire but also decreases the strength and durability of the tire if the lines are deep. In particular, when such lines occur on a relatively thin rubber layer such as the sidewall rubber, inner liner rubber and the like, the lines become a weak point.

Further, in comparison with the large-sized tires, small-sized tires need dimensional accuracy in high degree because the tire size is small, and the flow of rubber during vulcanization is limited due to the relatively low tire inflation pressure.

If the size of the rubber tape is decreased, the difference of the contour may be decreased. If the thickness (at) is decreased to less than 0.6 mm, the corrugation on the surface of the rubber component can be neglected, and the occurrence of defective lines may be prevented. In this case, however, the number of windings is greatly increased, and therefore, the working efficiency and production efficiency greatly decrease, and the production cost up is unavoidable. Further, as the rubber tape becomes thin, air becomes liable to remain between the windings of the tape and the total volume of remaining air increases as the number of the windings increases. Thus, separation or cracks are liable to start form the portion where air remains, and it is difficult to improve the tire durability.

Therefore, a primary object of the present invention is to provide a rubber tape which can form a tire rubber component with accuracy without unduly decreasing the thickness and thus can prevent the above-mentioned drawbacks.

Another object of the present invention is to provide a method of manufacturing a tire which can establish a flexible manufacturing system.

Still another object of the present invention is to provide an apparatus for making the rubber tape which is suitably used in the above-mentioned flexible manufacturing system.

According to the present invention, a rubber tape is provided on each side of a central part with a fin, the central part has a thickness of 0.3 to 1.5 mm, and the fin has a thickness less than the thickness of the central part and a width of from 0.5 to 5.0 mm.

According to the present invention, a method of manufacturing a tire comprises a step of making at least one of rubber components by winding the above-mentioned rubber tape.

According to the present invention, an apparatus for making the rubber tape comprises an extruder and a pair of calendar rollers, the extruder including a die having an extruding hole from which compounded rubber is extruded into a rectangular cross sectional shape, the extruding hole having an opening width WA1 of from 0.6 to 0.9 times the whole width W0 of the rubber tape, and an opening thickness HA1 of from 1.5 to 7.5 times the average thickness of the central part of the rubber tape, the calendar rollers provided therebetween with a gap between which the extruded rubber passes through, the gap having a shape which is similar to but smaller than a cross sectional shape of the rubber tape.

Embodiments of the present invention will now be described in detail in conjunction with the accompanying drawings.

Figure 1:
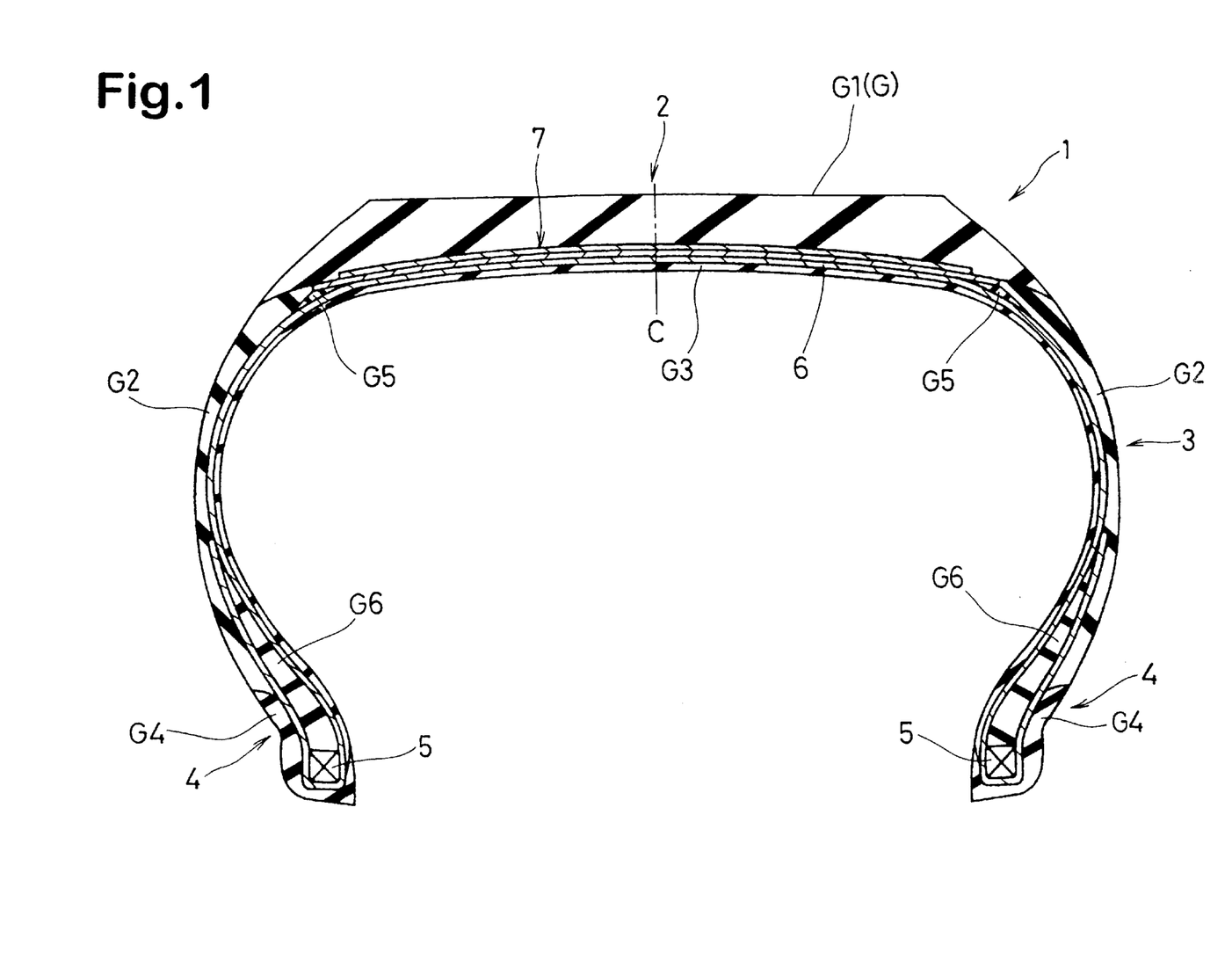
FIG. 1 is a cross sectional view of a pneumatic tire according to the present invention.

The tire 1 shown in FIG. 1 is a radial tire for passenger cars. The tire 1 is constructed from a plurality of rubber components G made of different rubber compounds and reinforced with cord layers including a carcass 6 and a breaker belt 7.

The carcass 6 comprises at least one ply of cords arranged at an angle of for example 70 to 90 degrees with respect to the tire equator C and extending between the bead portions 4 through the tread portion 2 and sidewall portions 3 and turned up around the bead core 5 in each bead portion 4.

The breaker belt 7 comprises a plurality of plies of cords laid at an angle of from 10 to 35 degrees with respect to the tire equator C.

For the carcass cords and breaker cords, organic fiber cords, e.g. nylon, polyester, rayon, aromatic polyamide and the like and steel cords can be used.

The above-mentioned rubber components G may include
a tread rubber G1 disposed in the tread portion 2 and defining a ground contacting face,
a sidewall rubber G2 disposed in each sidewall portion 3 and defining an outer surface of the sidewall portion,
an inner liner rubber G3 disposed along the inside of the carcass 6,
a clinch rubber G4 disposed in each bead portion 4 and defining an outer surface of the bead portion,
a breaker cushion rubber G5 disposed between each edge of the breaker 7 and the carcass 6,
a bead apex rubber G6 disposed on the radially outside of the bead core 5 and tapering radially outwards.

In the tire 1 according to the present invention, at least one of the above-mentioned rubber components G1 to G5 is formed by winding a ribbon-like unvulcanized rubber tape 9.

Figure 2:
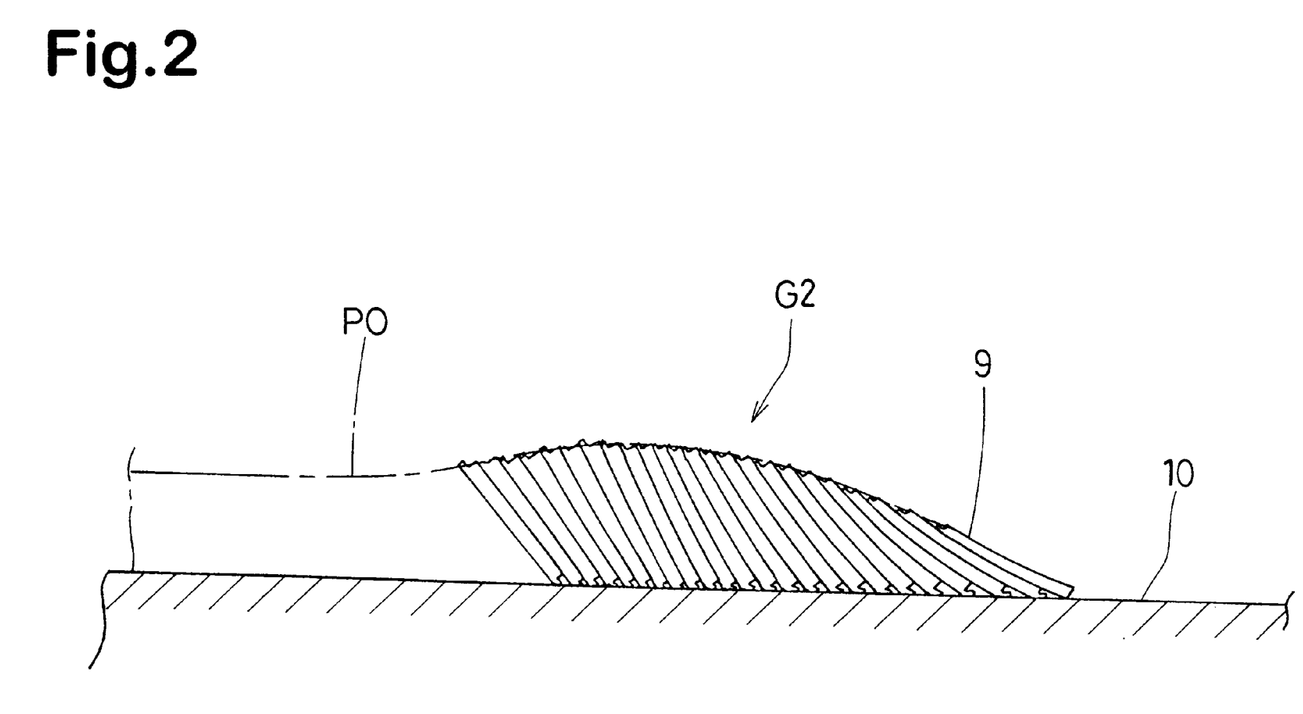
FIG. 2 is a cross sectional view of a part of a tire rubber component made of a lap-wound rubber tape.

The rubber tape 9 is, as shown in FIG. 2, wound around a drum 10 to be laminated each other into a cross sectional shape close to the target sectional shape P0 of the rubber component G (sidewall rubber G2, in this example).

The rubber tape 9 is provided on each side of a central part 9A with a relatively thin fin 9B.

Figure 3:
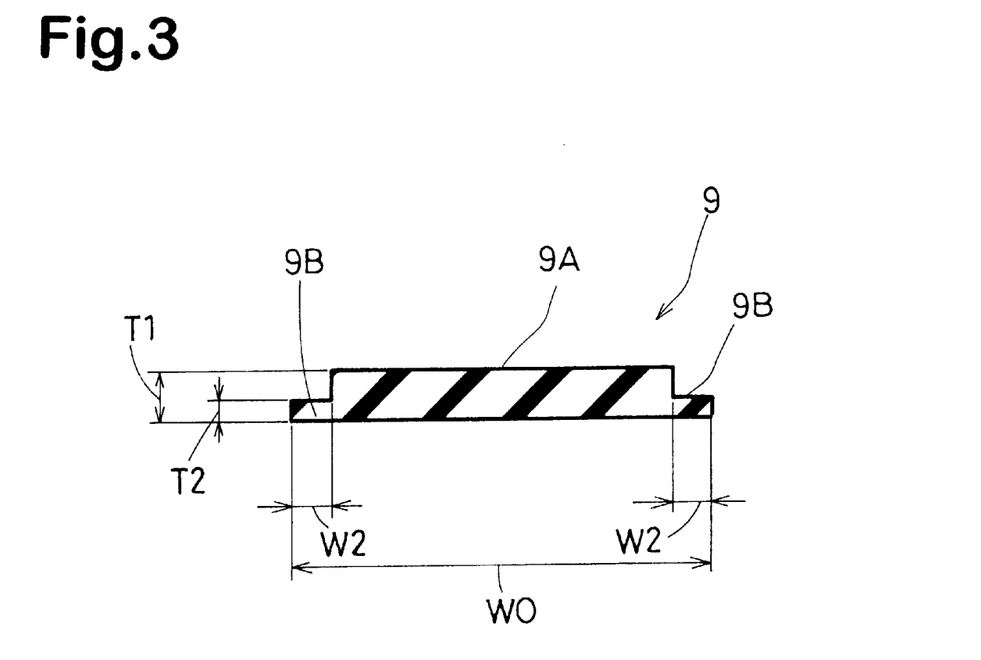
FIG. 3 is a cross sectional view showing an example of the cross sectional shape of the rubber tape.

FIG. 3 shows an example of the rubber tape 9, wherein the central thick part 9A has a substantially constant thickness T1 and thus it has a rectangular cross sectional shape of a very low aspect ratio.

Apart from a rectangular cross sectional shape, various shapes can be used as shown in FIGS. 5A–5D and FIGS. 6B–6E.

In FIG. 3 and FIGS. 5A–5D, the fins 9B are positioned such that the base thereof substantially aligns with the base of the central thick part 9A. It is however, not always necessary to align the bases. As shown in FIGS. 6A–6E, the fins 9B can be formed to protrude in the middle of the thickness of the central thick part 9A.

| FIG. | Top | Base | Symmetry |
|---|---|---|---|
| 5A | both edges tapered | flat | Right/Left |
| 5B | one edge tapered | flat | none |
| 5C | half ellipse | flat | Right/Left |
| 5D | reversed-W | flat | Right/Left |
| 6A | flat | flat | Right/Left & Up/Down |
| 6B | both edges tapered | both edges tapered | Right/Left & Up/Down |
| 6C | one edge tapered | one edge tapered | point |
| 6D | half ellipse | half ellipse | Right/Left & Up/Down |
| 6E | reversed-W | normal-W | Right/Left & Up/Down |

Figure 6A:
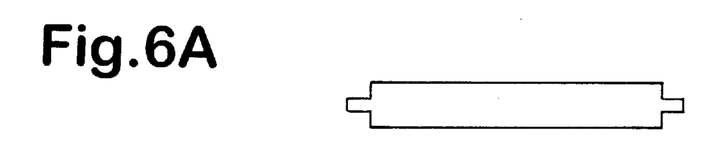
Figure 6B:
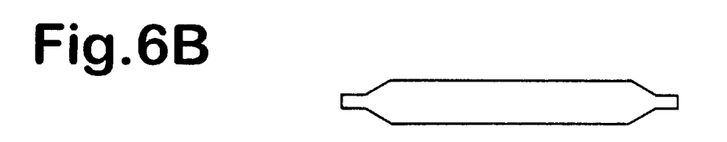
Figure 6C:
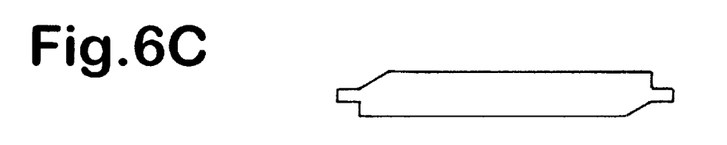
Figure 6D:
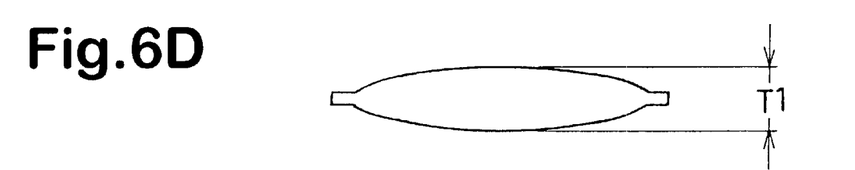
Figure 6E:
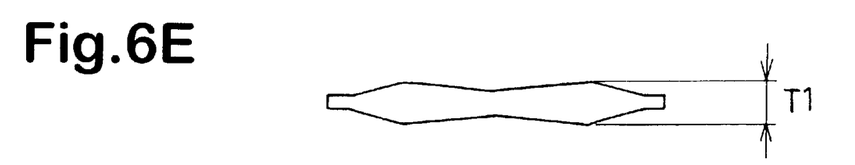

As shown in the figures other than FIG. 3 and FIG. 6A, the thickness T1 of the central thick part 9A can be changed partially or wholly. But, the thickness T2 of the fin 9B is substantially constant.

The thickness T1 of the central thick part 9A is set in the range of from 0.3 to 1.5 mm, preferably not less than 0.6 mm. The thickness T2 of the fin 9B is less than the thickness T1, preferably set in the range of from 0.2 to 0.5 mm.

The width W2 of each of the fins 9B is set in the range of from 0.5 to 5.0 mm. The whole width W0 of the rubber tape 9 can be determined according to the finished cross sectional shape of the rubber component G, but it is usually set in the range of from 5.0 to 40.0 mm.

Figure 4:
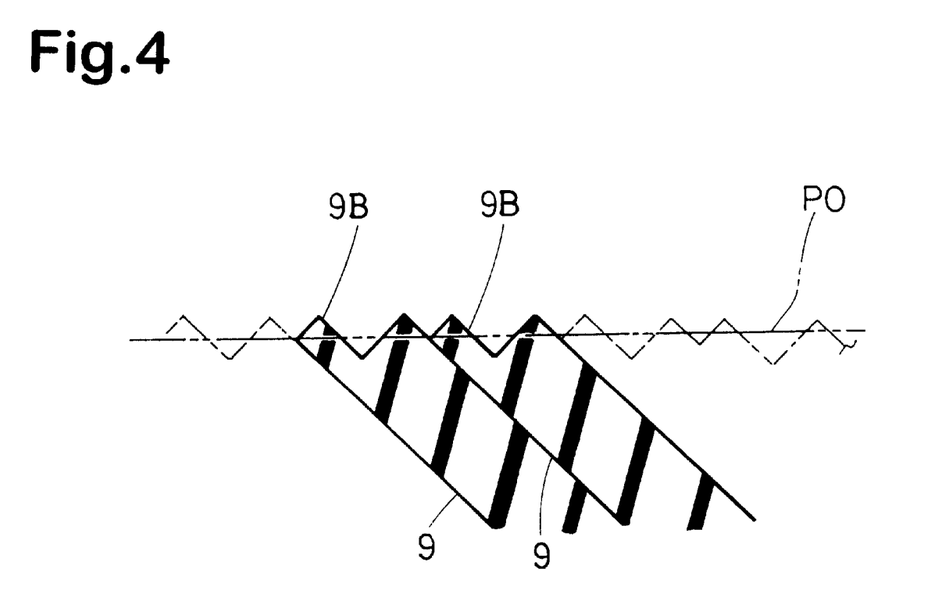
FIG. 4 is a diagram for explaining an effect of the fins of the windings of a rubber tape.
Figure 5A:
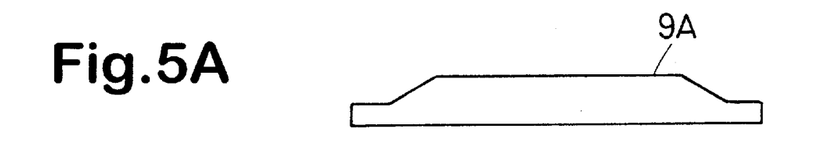
FIG. 5A to FIG. 5D and FIG. 6A to FIG. 6E are cross sectional views each showing another example of the cross sectional shape of the rubber tape.
Figure 5B:
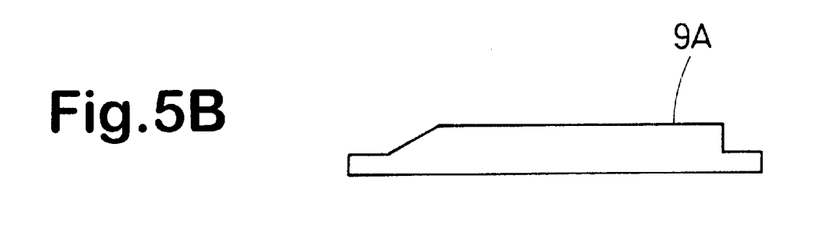
Figure 5C:
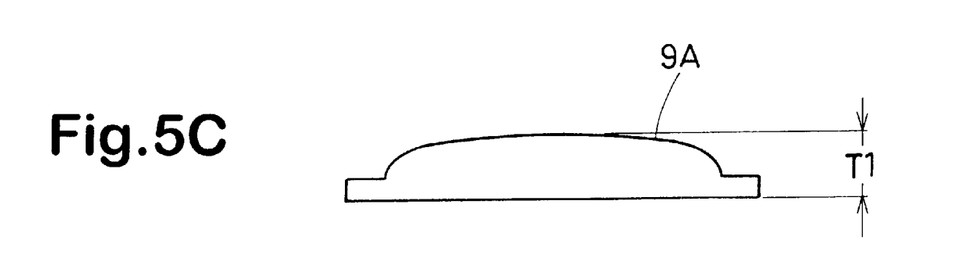
Figure 5D:
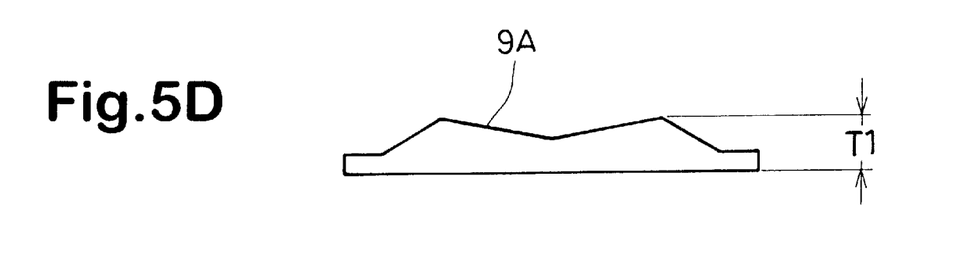

Therefore, as shown in FIG. 4, the fins 9B can even the surface formed by the edges of the windings of the rubber tape 9, and the difference from the target cross sectional shape P0 can be decreased. Although such a smooth surface can be obtained by winding a very thin rubber tape, the number of windings increases correspondingly and the production efficiency is greatly decreased. In contrast thereto, the rubber tape 9 with fins 9B according to the present invention can reduce the number of windings, and the production efficiency can be improved. Further, the remaining air can be decreased.

Figure 7:
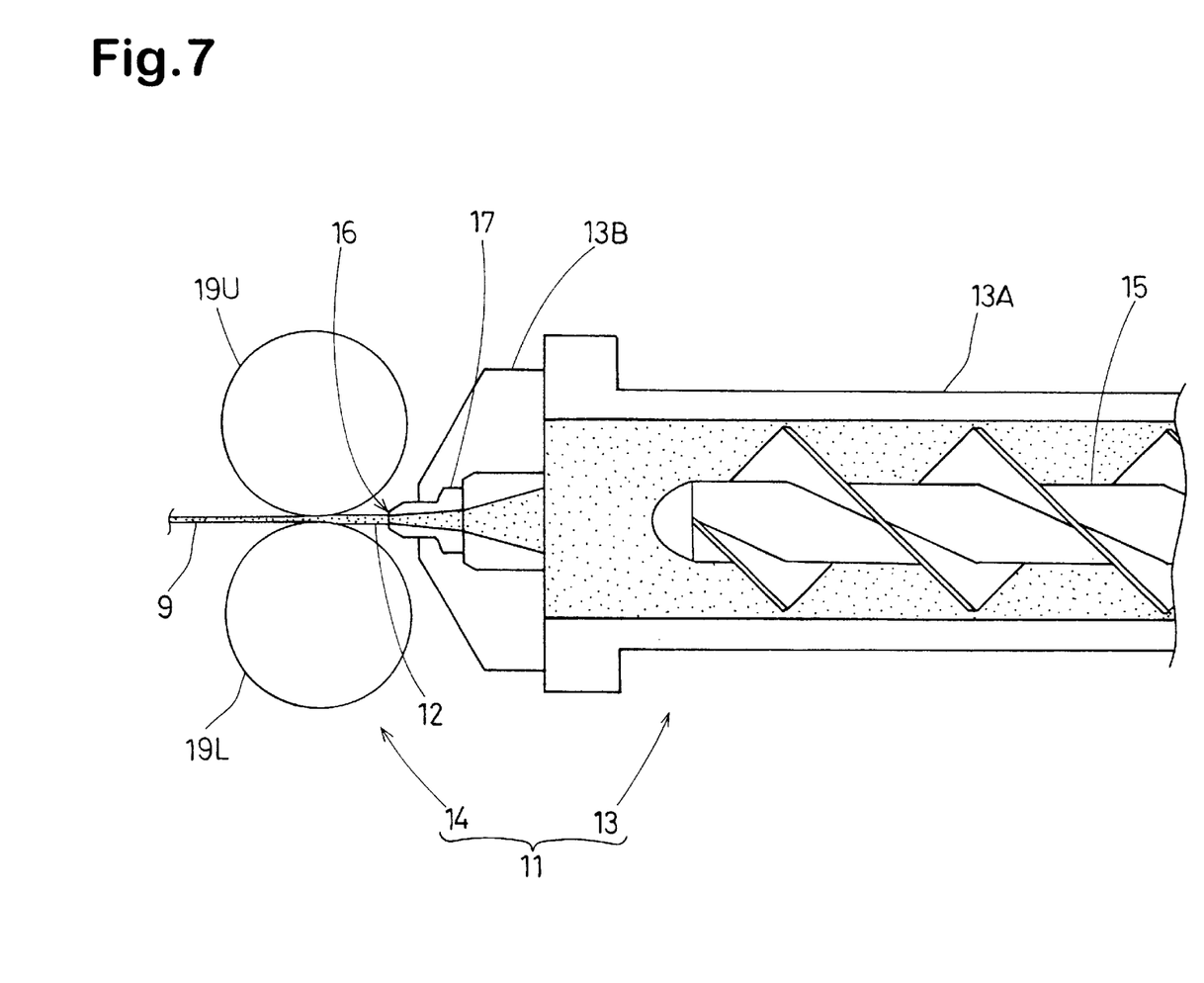
FIG. 7 is a cross sectional view of an apparatus for making the rubber tape.

Next, an apparatus 11 for making the rubber tape 9 will be explained according to FIG. 7.

The apparatus 11 comprises an extruder 13 and rollers 14.

The extruder 13 comprises a main body 3A provided therein with a screw 15 for mixing rubber materials and pushing the mixed compound rubber towards a head 13, the head 13B comprising a die 17 having an extruding hole 16 from which the compounded rubber 12 is extruded in a rectangular cross sectional shape of a low aspect ratio.

The extruding hole 16 has an opening width WA1 of from 0.6 to 0.9 times the whole width W0 of the rubber tape 9, and an opening height or thickness HA1 of from 1.5 to 7.5 times the average of the thickness T1 of the rubber tape 9.

Figure 8:
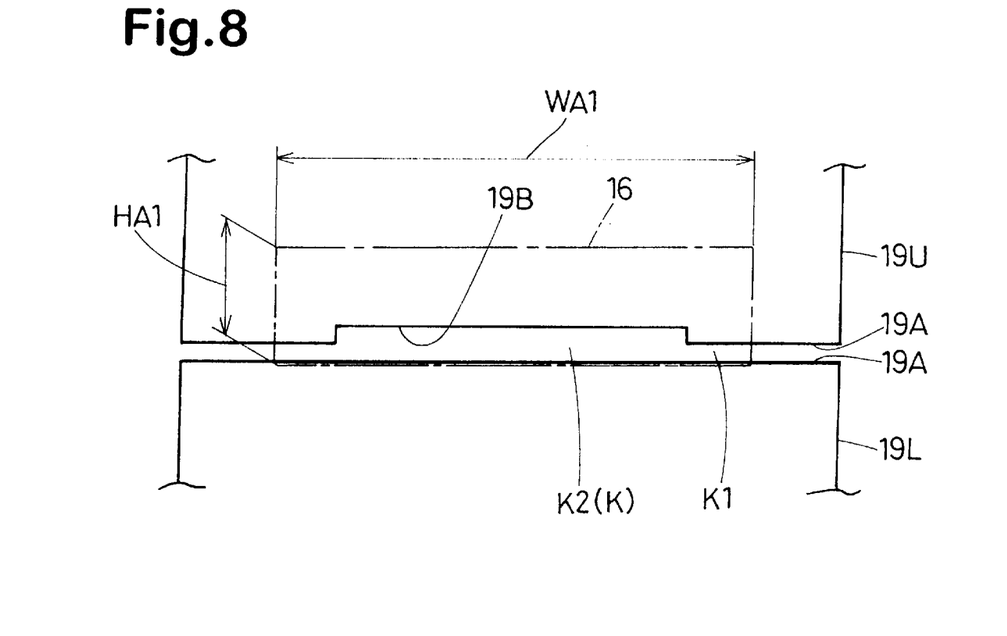
FIG. 8 is a cross sectional view showing a gap between calendar rolls.

The rollers 14 including a pair of upper and lower calendar rollers 19U and 19L disposed near the extruding hole 16. As shown in FIG. 8, a profiled gap K is formed between the upper and lower calendar rollers 19U and 19L. The shape of the gap K is similar to the cross sectional shape of the rubber tape 9, but the size of the gap is somewhat smaller than the size of the tape 9, which is usually set in a range of 57 to 80%.

In case of the cross sectional shapes shown in FIG. 3 and FIGS. 5A–5D, the lower calendar roller 19L has a cylindrical surface 19 (flat), but the upper calendar roller 19U is provided with a groove 19 between cylindrical surfaces 19A. Each of the fins 9B is formed by a part K1 between the upper and lower cylindrical surfaces 19A. The central thick part 9A is formed by a part K2 between the grooved part 19B and the lower cylindrical surface 19A.

In case of the cross sectional shapes shown in FIGS. 6A–6E, each of the upper and lower calendar rollers 19U and 19L is provided with a groove 19 between cylindrical surfaces 19A. The fins 9B are likewise formed by the upper and lower cylindrical surfaces 19A. The central thick part 9A is formed by a part between the upper and lower grooved parts 19B.

The compounded rubber 12 is first extruded into a rectangular shape and then rolled into the final shape. Therefore, the dimensional accuracy and stability is improved. As a result, conventional works to adjust the width of the rubber tape by cutting off the edges thereof can be omitted. Therefore, the production efficiency is improved.

If the opening thickness HA1 is more than 7.5×T1 and/or the opening width WA1 is less than 0.6×W0, the rubber tape 9 is liable to decrease in the quality and accuracy. If the opening thickness HA1 is less than 1.5 times the average thickness, the extruding pressure increases, and problems such as lowering of the dimensional stability, scorch and the like are liable to occur on the extruded rubber. If the opening width WA1 is more than 0.9×W0, the rubber tape 9 is liable to break during extruding, and the dimensional stability is lost.

Figure 9A:
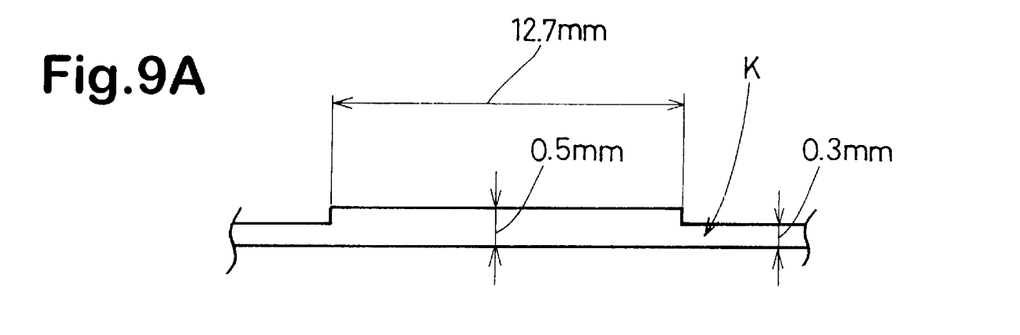
FIGS. 9A and 9B are diagrams showing dimensions of an extruding hole and gap used to form the rubber tape shown in Table
Figure 9B:
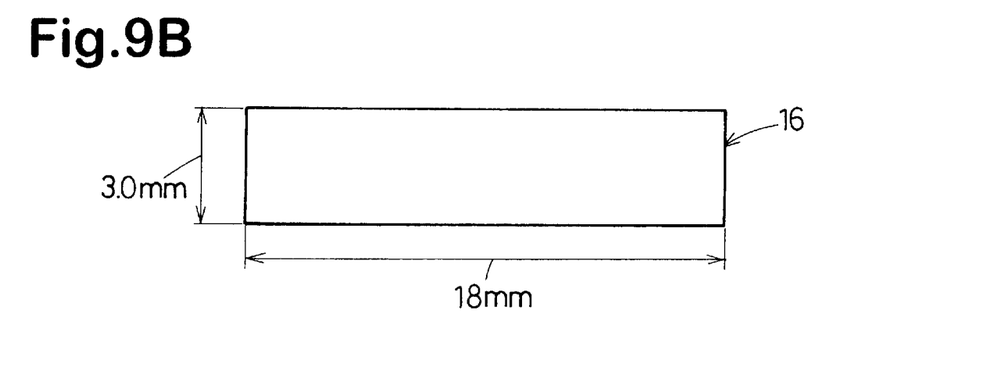

For example, a rubber tape 9 having the cross sectional shape shown in FIG. 3 wherein W0=22.0 mm, W2=2.0 mm, T1=0.75 mm and T2=0.3 mm can be made with accuracy at a speed of 50 meters/minute under the following conditions: the extruder is a 45 mm dia. cold feed extruder; the rotating speed of the screw is 80 RPM; the extruding hole 16 has a shape shown in FIG. 9B; the gap K has dimensions shown in FIG. 9A; and the extruding speed is about 9 meters/minute.

Using the above-mentioned apparatus 11, tires are manufactured.

The tire manufacturing method comprises at least a step of making a rubber component G by winding the above-mentioned rubber tape 9 with fins 9B.

Next, taking a pneumatic tire especially a radial tire as an example, a tire manufacturing method according to the present invention will be described.

As mentioned above, various rubber components such as the above-mentioned G1 to G6 can be made by lap-winding. In this embodiment, the tread rubber G1, sidewall rubber G2, inner liner rubber G3, clinch rubber G4, and breaker cushion rubber G5 are made by lap-winding. But the bead apex rubber G6 is made by means of extrusion as the bead apex rubber G6 and the bead core 5 are assembled into one body in another assembly line.

The tire manufacturing method comprises the steps of:

making each of the sidewall rubbers G2 by winding a rubber tape on a cylindrical winding surface of a tire building drum;

making each of the clinch rubbers G4 by winding a rubber tape on the cylindrical winding surface between the sidewall rubbers G2;

making the inner liner rubber G3 by winding a rubber tape on the cylindrical winding surface between the clinch rubbers G4;

making each of the breaker cushion rubber G5 by winding a rubber tape on each of the sidewall rubbers G2;

winding a carcass 6 on the inner liner rubber G3 and clinch rubbers G4;

setting a pair of bead-core-and-bead-apex-rubber assemblies on the carcass 6;

winding other tire components such as reinforcing layer and the like, if any, on the carcass and/or sidewall rubbers:

setting an annular tread assembly around the carcass 6;

expanding the drum such that the carcass between the bead cores 5 becomes a toloidal shape and contacts with the inside of the tread assembly;

turning up the carcass edges around the bead cores 5 together with the clinch rubbers G4, sidewall rubbers G2 and the like and connecting the sidewall rubbers G2 to the tread rubber G1; and vulcanizing the assembled raw tire in a mold.

The above-mentioned annular tread assembly is composed of a belt 7 (breaker) and the tread rubber G1 disposed on the radially outside thereof, and made by winding belt plies around a profiled belt drum, and then winding a rubber tape 9 therearound as the tread rubber G1. Incidentally, the rubber tapes 9 for forming the sidewall rubbers G2, clinch rubbers G4 and inner liner rubber G3 can be wound at the same time to decrease the winding time.

In the tire manufacturing method according to the present invention, it is possible to make all the rubber components by winding rubber tapes 2. But it is also possible to make only a specific rubber component or components, for example the sidewall rubbers only, by winding rubber tapes 2.

Comparison Tests

Pneumatic tires (Ex. and Ref.) of size 195/65R15 (rim size: 6.0XJJ) for passenger cars were made and checked for the defective lines on the outer surface of the tire and remaining air between the tape windings. In Ex. tire, the rubber components G1 to G5 were made by winding rubber tapes shown in FIG. 3. In Ref. tire, the rubber components G1 to G5 were made by winding rubber tapes shown in FIG. 10B.

Further, an accelerated durability test was made, using a drum type tire tester, under a tire load of 6.96 KN, inner pressure of 190 kpa and running speed of 80 km/h. After running for a distance of 30000 km, the rubber components G1 to G5 were checked for cracks or separations.

The specifications of the used tapes and test results are shown in the following Table 1.

TABLE 1

| Tire | Ex. | Ref. |
| --- | --- | --- |
| Rubber tape | | |
| Sectional shape | FIG. 3 | FIG. 10B |
| Thickness T1 (at) | 1.1 mm | 1.1 mm |
| Thickness T2 | 0.3 mm | — |
| Width W0 (aw) | 22.5 mm | 22.5 mm |
| Width W2 | 3.0 mm | — |
| Line | | |
| Tread rubber | good | good |
| Sidewall rubber | good | poor |
| Clinch rubber | good | poor |
| Breaker cushion rubber | good | good |
| Inner liner rubber | good | very poor |
| Air | | |
| Tread rubber | good | good |
| Sidewall rubber | good | good |
| Clinch rubber | good | good |
| Breaker cushion rubber | good | good |
| Inner liner rubber | good | good |
| Durability | | |
| Tread rubber | good | good |
| Sidewall rubber | good | very poor |
| Clinch rubber | good | poor |
| Breaker cushion rubber | good | good |
| Inner liner rubber | good | very poor |

What is claimed is:

1. A method of manufacturing a tire, the tire comprising rubber components, the method comprising a step of making at least one of the rubber components by winding a rubber tape, wherein the rubber tape is provided on each side of a central part with a fin, the central part having a thickness of 0.3 to 1.5 mm, the fin having a substantially constant thickness less than the thickness of the central part and a width of from 0.5 to 5.0 mm, and in a cross section of the rubber tape, the rubber tape has two sides which extend from one of the fins to the other fin defining said central part, said two sides have one of the following designs (1)–(9):

(1) one side is a straight line extending in the widthwise direction of the rubber tape, and the other side is a straight line extending in the widthwise direction of the rubber tape between two shorter lines perpendicular to the straight line;

(2) one side is a straight line extending in the widthwise direction of the rubber tape, and the other side is a straight line extending in the widthwise direction of the rubber tape between two shorter oblique lines;

(3) one side is a straight line extending in the widthwise direction of the rubber tape, and the other side is a straight line extending in the widthwise direction of the rubber tape between a shorter line perpendicular to the straight line, and a shorter oblique line;

(4) one side is a straight line extending in the widthwise direction of the rubber tape, and the other side is a curved line in a form of half ellipse;

(5) one side is a straight line extending in the widthwise direction of the rubber tape, and the other side is a zigzag line in a form of alphabetic character "W";

(6) each said side is a straight line extending in the widthwise direction of the rubber tape between two shorter lines perpendicular to the straight line;

(7) each said side is a straight line extending in the widthwise direction of the rubber tape between a shorter line perpendicular to the straight line and a shorter oblique line, and the positions of the shorter perpendicular line and shorter oblique line of one side is reverse to those of the other side;

(8) each said side is a curved line in a form of half ellipse;

(9) each said side is a zigzag line in a form of alphabetic character "W" the character "W" on one side being the reverse of that on the other side.

2. The method according to claim 1, wherein said at least one of the rubber components is at least one of sidewall rubber, inner liner rubber and clinch rubber being wound on a cylindrical face of a tire building drum.

3. The method according to claim 1, wherein said at least one of the rubber components is a tread rubber wound on a belt, the belt disposed radially inside a tread face of the tire.

* * * * *